(12) United States Patent
Sivley, IV et al.

(10) Patent No.: US 7,380,840 B2
(45) Date of Patent: Jun. 3, 2008

(54) EXPANDABLE THREADED CONNECTION

(75) Inventors: Robert S. Sivley, IV, Kingwood, TX (US); Harris A. Reynolds, Jr., Houston, TX (US)

(73) Assignee: Hydril Company, Houston, TX (US)

( * ) Notice: Subject to any disclaimer, the term of this patent is extended or adjusted under 35 U.S.C. 154(b) by 233 days.

(21) Appl. No.: 10/973,937

(22) Filed: Oct. 26, 2004

(65) Prior Publication Data

US 2006/0087119 A1    Apr. 27, 2006

(51) Int. Cl.
F16L 13/14    (2006.01)
F16L 15/00    (2006.01)

(52) U.S. Cl. ............... 285/334; 285/382.2; 285/382.4

(58) Field of Classification Search ............ 285/333, 285/334, 355, 390, 382, 382.1, 382.2, 382.4, 285/382.5

See application file for complete search history.

(56) References Cited

U.S. PATENT DOCUMENTS

| | | | |
|---|---|---|---|
| 2,273,017 A * | 2/1942 | Boynton | ............ 285/89 |
| RE30,647 E | 6/1981 | Blose | |
| 4,600,224 A | 7/1986 | Blose | |
| 4,703,954 A | 11/1987 | Ortloff | |
| RE34,467 E | 12/1993 | Reeves | |
| 5,366,012 A | 11/1994 | Lohbeck | |
| 5,454,605 A | 10/1995 | Mott | |
| 5,582,101 A | 12/1996 | Kuckhermann | |
| 5,901,789 A | 5/1999 | Donnelly et al. | |
| 5,924,745 A | 7/1999 | Campbell | |
| 5,984,568 A | 11/1999 | Lohbeck | |
| 6,012,522 A | 1/2000 | Donnelly et al. | |
| 6,065,500 A | 5/2000 | Metcalfe | |
| 6,254,146 B1 | 7/2001 | Church | |
| 6,273,634 B1 | 8/2001 | Lohbeck | |
| 6,315,040 B1 | 11/2001 | Donnelly | |
| 6,322,109 B1 | 11/2001 | Campbell et al. | |
| 6,409,175 B1 | 6/2002 | Evans et al. | |
| 6,554,287 B1 | 4/2003 | Sivley | |
| 6,578,880 B2 | 6/2003 | Watts | |
| 6,607,220 B2 | 8/2003 | Sivley | |
| 6,622,797 B2 | 9/2003 | Sivley | |
| 6,712,401 B2 | 3/2004 | Coulon et al. | |
| 6,722,443 B1 | 4/2004 | Metcalfe | |
| 6,722,706 B2 | 4/2004 | Church | |
| 6,811,189 B1 * | 11/2004 | DeLange et al. | ............ 285/333 |
| 6,997,264 B2 * | 2/2006 | Simpson et al. | ............ 166/380 |
| 2002/0070031 A1 | 6/2002 | Voll et al. | |
| 2003/0067166 A1 * | 4/2003 | Sivley, IV. | ............ 285/333 |
| 2003/0075338 A1 * | 4/2003 | Sivley, IV. | ............ 166/380 |
| 2003/0132633 A1 * | 7/2003 | Maeda et al. | ............ 285/333 |
| 2003/0197376 A1 * | 10/2003 | Sivley, IV. | ............ 285/333 |
| 2004/0017081 A1 * | 1/2004 | Simpson et al. | ............ 285/333 |
| 2004/0104575 A1 * | 6/2004 | Ellington et al. | ............ 285/333 |
| 2006/0006647 A1 * | 1/2006 | Hashem et al. | ............ 285/333 |

FOREIGN PATENT DOCUMENTS

WO    WO 2004/023014 A2 *    3/2004

* cited by examiner

Primary Examiner—James M. Hewitt
(74) Attorney, Agent, or Firm—Osha Liang LLP

(57) ABSTRACT

Tubular connections and methods of designing tubular connections having selected root/crest clearance when the box member and pin member are made-up. When the tubular connection is radially expanded, a thread seal is formed over at least part of the tubular connection.

13 Claims, 5 Drawing Sheets

EXPANDABLE THREADED CONNECTION

BACKGROUND OF INVENTION

Casing joints, liners, and other oilfield tubulars are often used in drilling, completing, and producing a well. Casing joints, for example, may be emplaced in a wellbore to stabilize a formation, to protect a formation against elevated wellbore pressures (e.g., wellbore pressures that exceed a formation pressure), and the like. Casing joints may be coupled in an end-to-end manner by threaded connections, welded connections, and other connections known in the art. The connections may be designed so as to form a seal between an interior of the coupled casing joints and an annular space formed between exterior walls of the casing joints and walls of the wellbore. The seal may be, for example, an elastomeric seal (e.g., an o-ring seal), a metal-to-metal seal formed proximate the connection, or similar seals known in the art. In some connections, seals are formed between the internal and external threads. Connections with this characteristic are said to have a "thread seal." As used herein, a "thread seal" means that a seal is formed between at least a portion of the internal thread on the box member and the external thread on the pin member.

FIG. 2 shows a cross section of a prior art made-up tubular threaded connection with wedge threads as disclosed in U.S. Pat. No. RE 30,647 issued to Blose, which is assigned to the assignee of the present invention and incorporated herein by reference. Wedge threads are characterized by threads with increase in width (i.e. axial distance between flanks 208 and 209) in opposite directions on the pin connection 201 and box connection 2000. Wedge threads are extensively disclosed in U.S. Pat. No. RE 34,467 issued to Reeves, U.S. Pat. No. 4,703,954 issued to Ortloff, and U.S. Pat. No. 5,454,605 issued to Mott, all assigned to the assignee of the present invention and incorporated herein by reference. This made-up connection consists of female box connection 200, and male pin connection 201. The made-up connection has overall connection length 202 (or the quantity L1) from pin nose 203 to box nose 204, and engaged thread length 205 (or the quantity L2) from the beginning of first engaged thread on the pin 206 to the end of last engaged thread on the pin 207. Note that engaged thread length 205 cannot always be measured in the same axial plane as implied by FIG. 2, as the start of the first engaged thread will not always lie in the same axial plane as the end of the last engaged thread.

The wedge thread-form has stab flanks 208, so called because they generally come into contact when the threaded connection is initially "stabbed" together to be made-up. The stab flanks 208 support the weight of the tubular before the connection is fully made-up. The thread-form also has load flanks 209, so called because they carry tensile load exerted on a made-up connection within a string of casing hanging in a wellbore. The thread-form on pin connection 201 has pin thread roots 210 and pin thread crests 211. The thread-form on box connection 200 has box thread roots 212 and box thread crests 213.

Referring to FIG. 2, one distinction between U.S. Pat. No. RE 30,647 issued to Blose and U.S. Pat. No. RE 34,467 issued to Reeves is that Blose discloses a wedge thread with clearance between the pin thread crest 211 and box thread root 212 and between the box thread crest 213 and pin thread root 210, while Reeves discloses a selected amount of interference between the roots and crests. Root-crest interference, in addition to the stab flank and load flank interferences inherent in wedge threads, provides a thread seal. This thread seal can provide a backup to other sealing mechanisms, or it can be used alone. The clearance disclosed by Blose is shown as gap A and gap B in FIG. 2. Wedge threads as disclosed by Reeves have replaced those taught by Blose in part because gaps A and B prevent the connection from being able to seal high pressures.

In some well construction operations, it is advantageous to radially plastically expand threaded pipe or casing joints in a drilled ("open") hole or inside a cased wellbore. In a cased wellbore, radially expandable casing can be used to reinforce worn or damaged casing so as to, for example, increase a burst rating of the old casing, thereby preventing premature abandonment of the hole. In open hole sections of the wellbore, the use of radially expandable casing may reduce a required diameter of a drilled hole for a desired final cased hole diameter, and may also reduce a required volume of cement required to fix the casing in wellbore.

An expansion tool is typically used to plastically radially expand a string of casing or tubing disposed inside a wellbore from an initial condition (e.g., from an initial diameter) to an expanded condition (e.g., with a larger diameter). One common prior-art expansion process uses a conically tapered, cold-forming expansion tool 101 (commonly referred to as a "pig") shown in FIG. 1 to expand casing in a wellbore. The expansion tool 101 is generally sealed inside of a pig launcher (not shown), which is a belled section attached to a lower end of a casing string that is run into the wellbore. Because the pig launcher must pass through the parent casing already installed in the wellbore, the pig launcher has an outer diameter that is less than a "drift diameter" of the parent casing. As used herein, the "drift diameter" is the maximum external diameter that can pass through a wellbore or casing installed in the wellbore. Generally, the drift diameter is somewhat smaller than the internal diameter of the wellbore or casing due to the wellbore not being perfectly straight. Because of this, a tool having exactly the internal diameter of the parent casing would be unable to move freely through the parent casing.

Typically, after running the casing string into the wellbore, the casing string is suspended inside the wellbore using slips (not shown). Then, drill pipe (not shown) is run into the wellbore and latched onto the expansion tool 101. After connecting the drill pipe, the weight of the casing string is supported by the expansion tool 101. The drill pipe is then used to further lower the casing string to the selected location in the wellbore. The expansion tool 101 includes a tapered section 98A having a taper angle 98B that is generally between 5 degrees and 45 degrees. The expansion tool 101 is generally symmetric about a longitudinal axis 97 thereof. The expansion tool 101 also includes a cylindrical section 96 having a diameter that corresponds to a desired expanded inner diameter of a casing string (not shown) that is followed by a tapered section 95. Note that in some instances, an expansion tool 101 may not have a cylindrical section 96.

The next step in this exemplary expansion process is to pump cement through the drill pipe and out of a cement port on the pig. The cement flows between the outside of the casing string to be expanded and the inside of the wellbore. After the selected amount of cement has been pumped, the cement port is sealed off, typically by a dart designed to seat in the cement port. The dart is usually pumped with drilling fluid through the drill pipe. Continuing to pump drilling fluid pressurizes the pig launcher, which drives the expansion tool 101 forward (i.e. upward toward the surface) and the casing further into the wellbore. As the expansion tool 101 moves forward, the casing string expands. Expansion generally continues until the entire casing string has been expanded.

Depending on the length of expansion to be performed, the expansion process may be performed in length increments to remove lengths of drill pipe as the expansion tool 101 progresses upward. In many instances, the casing string will include a length of casing that remains inside the parent casing after expansion. The extra length of casing can be designed to act as a liner hanger for the casing string and to seal between the parent casing and the expanded casing string.

In this expansion process, a rate of radial expansion is determined by, for example, a total plastic strain required to expand the casing string, the taper angle 98A, and a rate of axial displacement of the expansion tool 101 through the casing string. Consistency of the expansion process is controlled by transitions along the expansion tool 101 and a cross-sectional area of, for example, lengths of casing that form the casing string, threaded connections that couple the length of casing, and the like.

The expansion tool 101 may be started at either the bottom or the top of the casing string depending on the tool design and the application. Radial expansion may be performed at rates of, for example, 25 to 60 feet per minute. Other expansion processes, such as expansion under localized hydrostatic pressure, or "hydroforming," are known in the art, but are generally not used as much as cold-forming expansion processes. Other expansion tools for cold-forming the casing also exist. Various tools exist for use in cold-forming expansion processes.

A common problem with radial expansion of casing is that the connections can be damaged during the expansion process. Part of this damage is because the connections are stressed during make-up to ensure that the connections remain made-up while being installed in the wellbore. The additional stress experienced by the connections during radial expansion can cause the connection to fail. Typically, it is the box member that splits. Even if complete failure does not occur, connections may lose the ability to form a hydraulic seal. Connections that utilize metal to metal seals or thread sealing can lose the ability to seal after the deformation caused by radial expansion.

While various expansion methods, in particular the tapered expansion tool method, have proven to work quite well on casing strings, the expansion of made-up threaded connections can result in structural sealing problems. Threaded connections that undergo radial plastic expansion have a tendency to exhibit a non-uniform axial elongation and react differently to residual hoop stresses remaining after expansion. Specifically, male (pin) threaded members and female (box) threaded members deform differently during radial expansion. The box member will generally move away from the pin member during radial expansion. This is due in part to the relief of residual stress in the connection that exists from the make-up of the box member with the pin member. The radial movement of the box member from the pin member relieves some of the residual stress. This differential displacement phenomenon can result in a loss of preload in axially-engaged seals, making the use of conventional metal-to-metal seals (including, for example, shoulder seals) problematic for plastically radially expanded casing and tubing.

One of the more successful thread-forms for expandable casing applications is the wedge thread. One reason that wedge threads are a suitable thread-form for expandable casing applications is that they may not make-up against a radial torque shoulder (i.e. a positive stop), but instead typically make-up by nearly simultaneous contact of thread load flanks 209 and stab flanks 208. During the expansion process, axial stress in the connection will often cause a radial torque shoulder to fail when the compressive stresses at the shoulder exceed the compressive yield strength of the casing material. The advantages of a wedge thread are independent of the thread form used. When a dovetail-shaped or another closed thread form is used for the wedge thread, the wedge thread will also resist radial forces during and after expansion, which might tend to separate the pin connection from the box connection. An open thread form for the wedge thread may also be used, such as that taught by U.S. Pat. No. 6,578,880 B2, issued to Watts, and incorporated herein by reference.

As discussed above, the additional stress experienced by a connection during radial expansion can cause the box member to fail, or cause the connection to lose the ability to form a thread seal or metal to metal seal. The structural integrity and sealing ability of a connection are still needed after expansion. Thus, preventing the damage to the connection and providing a thread seal after expansion are highly desirable goals. Designing a connection for the purpose of being radially expanded could prevent failure of the box member and potentially maintain a thread seal.

SUMMARY OF INVENTION

In one aspect, the present invention relates to an expandable tubular connection. The expandable tubular connection includes a pin member having a pin thread with a pin thread crest and a pin thread root and a box member having a box thread with a box thread crest and a box thread root. The pin thread and box thread are wedge threads. A selected gap exists between the pin thread crest and the box thread root after the selected make-up of the pin member with the box member. The gap is selected such that, when the connection is plastically radially expanded by a selected percentage, there is a desired interference between the pin thread crest and the box thread root forming a thread seal over a portion of the connection.

In another aspect, the present invention relates to an expandable tubular connection. The expandable tubular connection includes a pin member having a pin thread with a pin thread crest and a pin thread root and a box member having a box thread with a box thread crest and a box thread root. The pin thread and box thread are wedge threads. A selected gap exists between the pin thread root and the box thread crest after the selected make-up of the pin member with the box member. The gap is selected such that, when the connection is plastically radially expanded by a selected percentage, there is a desired interference between the pin thread root and the box thread crest forming a thread seal over a portion of the connection.

In another aspect, the present invention relates to a method of designing a tubular connection with a pin member and a box member. The method includes determining an amount of radial expansion and a method for radially expanding the radially expandable tubular. Then, a gap size between a box thread crest and a pin thread root is selected based on the amount of radial expansion and the method for radially expanding the tubular. The gap exists upon selected make-up of the box member with the pin member. After a radial expansion of the connection, a thread seal is formed between the box member and pin member.

In another aspect, the present invention relates to a method of expanding a tubular having a connection with a pin member and a box member. The method includes lowering at least two tubulars into a wellbore. The at least two tubulars are joined by a connection having a box member on a first of the at least two tubulars and a pin member on a second of the at least two tubulars. The method further includes passing an expansion tool through the at least two tubulars to radially expand the at least two tubulars. A selected gap exists between a box thread crest and a pin thread root upon make-up of the box member with the pin member. After radial expansion of the at least two tubulars, a thread seal is formed between the box member and pin member.

In another aspect, the present invention relates to a method of expanding a connection with a pin member and a box member. The method includes making-up the pin member with the box member such that a selected gap exists between a box thread crest and a pin thread root. The connection is then expanded such that there is a desired interference between the box thread crest and the pin thread root forming a thread seal over a portion of the connection.

In another aspect, the present invention relates to a method of expanding a connection with a pin member and a box member. The method includes making-up the pin member with the box member such that a selected gap exists between a box thread root and a pin thread crest. The connection is then expanded such that there is a desired interference between the box thread root and the pin thread crest forming a thread seal over a portion of the connection.

Other aspects and advantages of the invention will be apparent from the following description and the appended claims.

DETAILED DESCRIPTION

In one aspect, the present invention provides connections that are designed to be radially expanded. More specifically, embodiments of the present invention have a selected gap between the roots and crests of wedge threads on a box member and a pin member such that there is a desired interference between the roots and crests after the connection is radially expanded.

Figure 1:
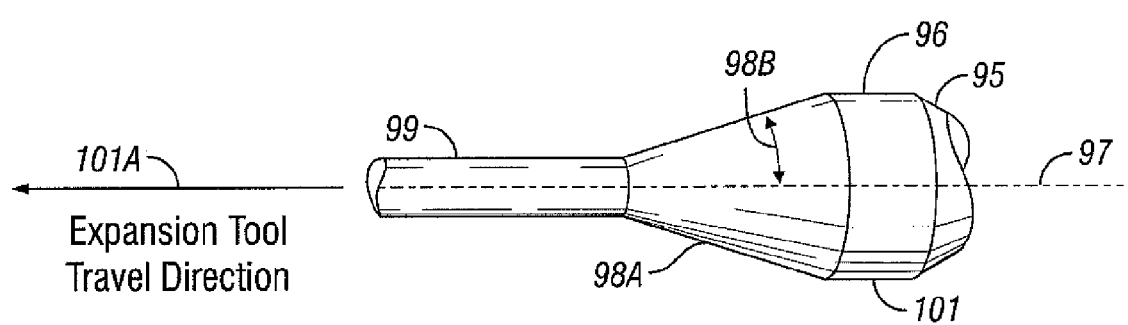
FIG. 1 shows a typical radial expansion tool.
Figure 2:
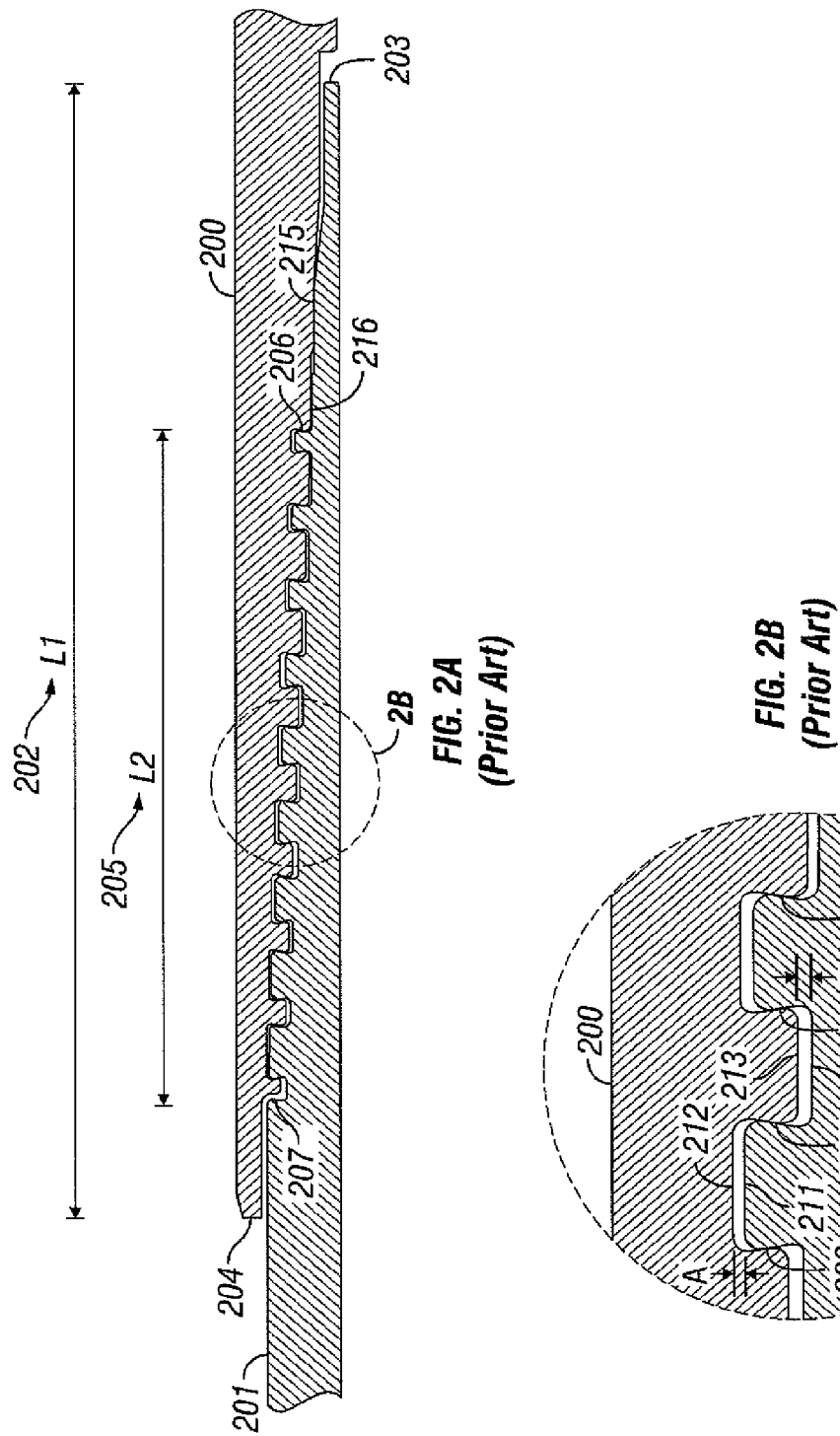
FIG. 2 shows a cross section of a prior art tubular connection.

Returning to FIG. 2, the present inventors believe that specifically selecting a gap size A between the pin thread crest 211 and box thread root 212 and a gap size B between the box thread crest 213 and pin thread root 210 for the purpose of expansion can provide a connection that is better able to withstand the stresses of radial expansion and provide a thread seal after expansion occurs. During expansion, the selected gaps A and B will close until there is a desired amount of root/crest interference. The desired amount of root/crest interference will depend largely on the amount of pressure to be contained by the connection. One of ordinary skill in the art will appreciate that the required amount of contact pressure between the roots and crests (i.e. root/crest interference) might vary. For example, the amount of pressure to be contained by the connection or the amount of torque used to make-up the connection can vary the required amount of root/crest interference.

Figure 3:
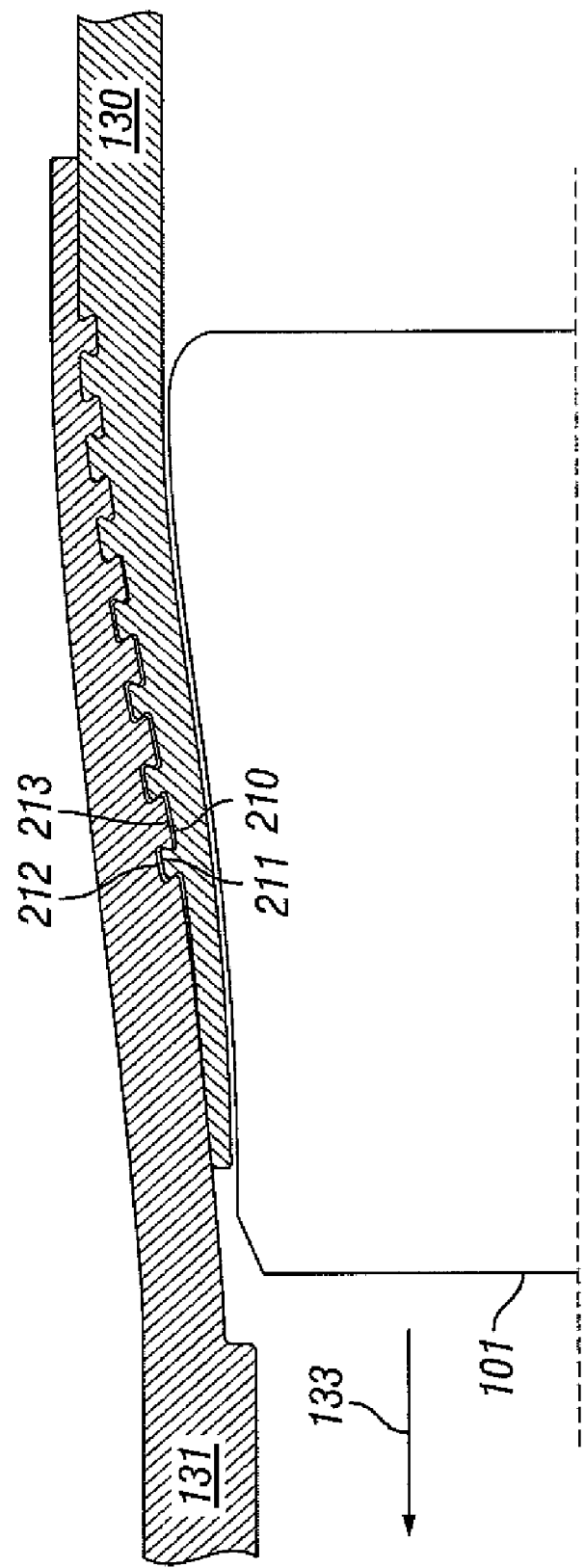
FIG. 3 shows a cross section of an expandable tubular connection that is partially expanded in accordance with an embodiment of the present invention.

FIG. 3 shows a connection in accordance with one embodiment of the present invention. In FIG. 3, the connection is being radially expanded by an expansion tool 101. The connection includes a box member 131 and a pin member 130. The expansion tool 101 travels in the direction of expansion 133. The wedge threads on the pin member 130 and box member 131 have been made to have a selected gap A between the pin thread crest 211 and box thread root 212 and a gap B between the box thread crest 213 and pin thread root 210. Note that the gaps A and B are exaggerated in FIG. 3 for illustrative purposes. The actual selected gaps A and B are between about 0.001 and about 0.010 inches. In some embodiments, the selected gaps A and B may be between 0.002 and 0.004 inches.

Continuing with FIG. 3, as radial expansion of the connection occurs, the box member 131 radially expands in response to the radial expansion of the pin member 130. During the radial expansion, the selected gaps A and B are closed and a desired interference occurs between the between the pin thread crest 211 and box thread root 212 and between the box thread crest 213 and pin thread root 210. Machining tolerances and inconsistencies in expansion processes may result in uneven interference, however, only interference between a portion of a full pitch (i.e. 360 degrees of interference between either the pin thread crest 211 and box thread root 212 or box thread crest 213 and pin thread root 210) is necessary to provide a thread seal. Generally, about 90 degrees to 360 degrees of root/crest interference is sufficient for a thread seal. Having root/crest interference over the full length of the connection is the most effective for having a thread seal, but is not required. Accordingly, one of ordinary skill in the art will appreciate that selected gaps A and B do not need to exist over the entire length of the connection to achieve some of the advantages of the present invention. Further, because only some root/crest interference is needed for thread sealing, some embodiments of the invention may only have a selected gap A or a selected gap B over a portion of the connection.

Figure 4:
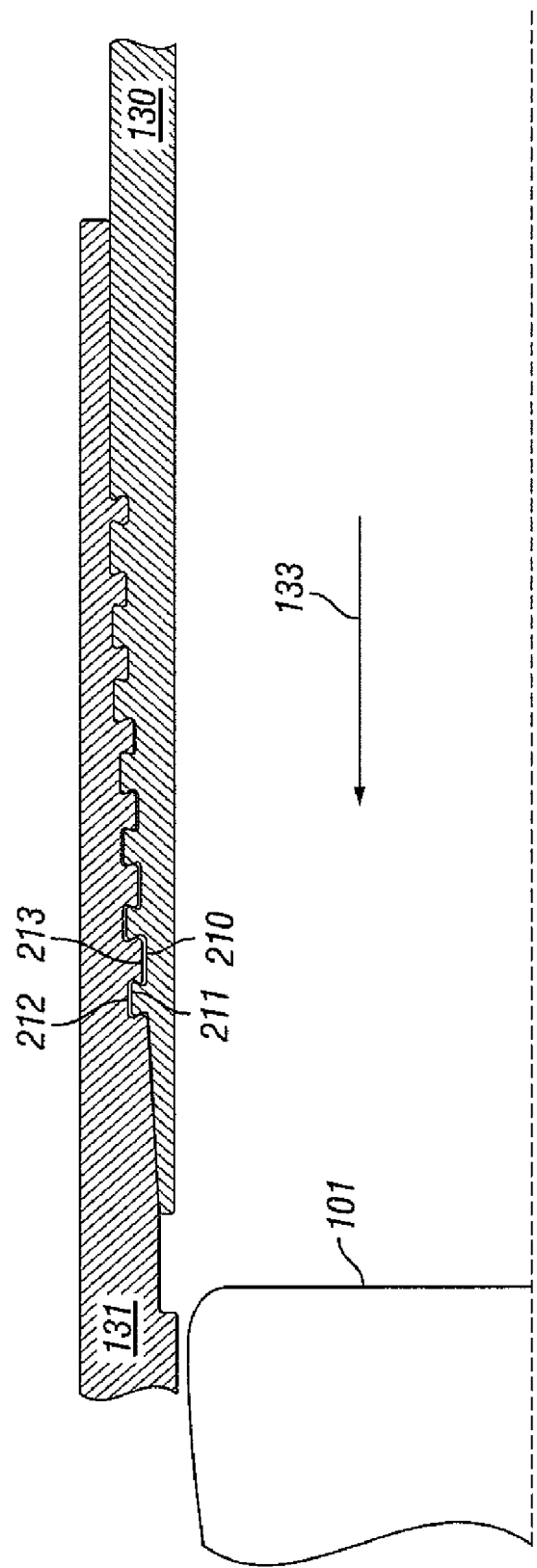
FIG. 4 shows the expandable tubular connection in FIG. 3 after being fully expanded.

FIG. 4 shows the fully expanded condition of the connection shown in FIG. 3. The expanded connection in FIG. 4 has root/crest interference over the full length of the connection. In many applications, root/crest interference over the full length of the connection may not be achieved. As discussed above, root/crest inference is only required over part of the connection to create a thread seal.

To achieve a desired amount of root/crest interference, the selected gaps A and B will vary based on several factors. The amount of radial expansion to be performed has a direct relationship with the size of the selected gaps A and B. For a higher amount of radial expansion, larger selected gaps A and B are appropriate. Another factor to consider is the thread form. For example, dovetailed threads hold the box member and pin member together during radial expansion, while a buttress thread does not. Accordingly, smaller selected gaps A and B would generally be used for a dovetailed wedge thread. Other factors to consider are the specific expansion tools and methods, wall thickness of the tubular, and material. Those of ordinary skill in the art will appreciate that finite element analysis or actual expansion tests may be performed to determine selected gaps A and B to achieve desired amounts of root/crest interference after radial expansion.

Figure 5:
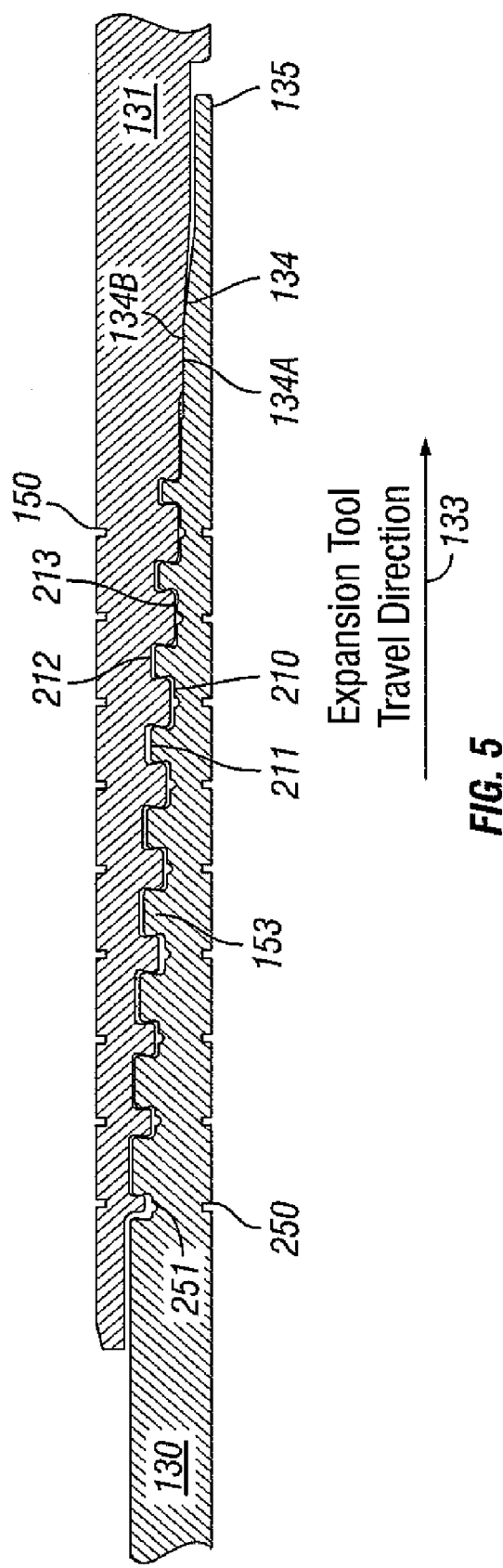
FIG. 5 shows a cross section of an expandable tubular connection in an unexpanded condition in accordance with an embodiment of the present invention

FIG. 5 shows a connection in accordance with one embodiment of the present invention. The connection shown in FIG. 5 is in the unexpanded state. The connection comprises a pin member 130 having pin threads 153, and a box member 131 having box threads 132. Moreover, the pin member 130 and the box member 131 may include corresponding adjacent seal surfaces 134A, 134B, respectively, adapted to form a metal-to-metal seal 134 upon make-up of the connection. In this embodiment, the threads 153 and 132 are generally dovetail-shaped, which helps prevent the pin member 130 and the box member 131 from deforming radially relative to one another during radial plastic expansion.

In the embodiment shown in FIG. 5, a helical groove 150 having a rectangular cross section is formed on the outside of the box member 131. The function of the helical groove 150 is disclosed in the U.S. Patent Application titled "Helical Groove for a Tubular Connection," filed on Oct. 5, 2004, by the present inventors and assigned to the assignee of the present invention. That application is incorporated by reference in its entirety. One of ordinary skill in the art will appreciate that the cross section of the helical groove 150 may vary in size and shape without departing from the scope of the invention. For example, in other embodiments, the helical groove 150 may have a V-shaped, parabolic, U-shaped, or semi-circle cross section. The helical groove 150 is at substantially the same axial position as the box thread crest 213. This positioning of the helical groove 150 may be referred to as being "in-lead" above the box thread 132. Because the expansion tool does not contact the box member, only the pin member directly experiences axial force imposed by the expansion tool (not shown). This causes the pin member 130 to elongate, which forces the box member 131 to elongate a lesser amount due to the connection between the two members. The box member 131 resists the elongation because of the thickness at the box thread crest 213. By locating the helical groove 150 in-lead above the box thread crest 213, the wall thickness of the box member is reduced where it normally has an increased thickness. The reduction in wall thickness resulting from the helical groove 150 relieves the axial stress experienced by the box thread.

Continuing with FIG. 5, other grooves for controlling stresses during radial expansion of the connection are shown. Stress relief grooves are disclosed in U.S. Pat. No. 6,607,220 issued to Robert S. Sivley, IV, and assigned to the assignee of the present invention. That patent is incorporated by reference in its entirety. In FIG. 5, a thread root groove 251 is formed in the pin thread root 210. Radial expansion of the connection can cause localized stress concentrations in the threads. However, the thread root groove 251 is adapted to reduce, control, or otherwise focus expansion strains in the region proximate the pin thread roots 210 so as to minimize post-expansion distortion of the thread form. The inclusion of a thread root groove 251 in some embodiments of the invention may help to achieve the selected amount of root/crest interference. One of ordinary skill in the art will appreciate that a similar thread root groove 251 may be used in the box thread roots 212 to achieve a similar result.

A helical groove 250 is also shown on the pin member 130 in FIG. 5. The helical groove 250 is designed to control axial strains formed by the radial expansion of the connection. The helical groove 250 essentially causes axial strain proximate the internal diameter of the pin member 130 to become "more positive," thereby reducing an amount by which the pin member 130 displaces radially inward. Analogous to the helical groove 150 on the outer surface of the box member 131, the helical groove 250 on the inner surface of the pin member 130 may be formed substantially in lead with the pin thread root 210. This helps to reduce hoop stresses formed proximate the threads, thereby reducing a tendency of the threads to "jump-out" or separate because of the loading generated by radial expansion of the threaded connection.

All of the grooves shown in FIG. 5 are exaggerated in size relative to the connection for illustrative purposes. The actual depth of each groove may be as little as 0.005 inches to 0.125 inches depending on the exact embodiment. The amount of expansion to be performed, the thickness of the connection, expansion tool and method to be used, material, and thread type each affect the depths of the grooves. Each disclosed groove may be used individually or in combination with one or more other disclosed grooves to control the deformation of the connection during radial expansion. Some experimentation will be needed to determine the actual dimensions of each groove.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An expandable tubular connection comprising:
  a pin member having a pin thread, wherein the pin thread comprises a pin thread crest, a pin load flank and a pin stab flank, and a pin thread root;
  a box member having a box thread, wherein the box thread comprises a box thread crest, a box load flank and a box stab flank, and a box thread root,
  wherein the pin thread and the box thread are wedge threads, such that upon selected make-up of the pin member with the box member:
    a selected gap exists between the pin thread crest and the box thread root and the pin thread root and the box thread crest; and
    the load and stab flanks of the pin and box threads are in interference;
  wherein upon plastic radial expansion of the selectively made-up tubular connection by a selected percentage, the selected gap becomes a selected interference; and
  wherein the selected interference results in a thread seal over substantially all of the expanded tubular connection.

2. The expandable tubular connection of claim 1, wherein the selected gap is from about 0.001 inches to about 0.010 inches.

3. The expandable tubular connection of claim 2, wherein the selected gap is from about 0.001 inches to about 0.004 inches.

4. The expandable tubular connection of claim 1, wherein the wedge threads have a generally dovetailed shape.

5. The expandable tubular connection of claim 1, wherein the wedge threads have an open thread form.

6. The expandable tubular connection of claim 1, wherein a helical groove is formed on an outer surface of the box member substantially in lead with the box thread root.

7. The expandable tubular connection of claim 1, wherein a helical groove is formed on an inner surface of the pin member substantially in lead with the pin thread root.

8. The expandable tubular connection of claim 1, wherein a thread root groove is formed in one of the pin member and the box member.

9. The expandable tubular connection of claim 1, wherein the resulting thread seal is the only seal mechanism between the pin member and the box member.

10. The expandable tubular connection of claim 1, wherein prior to plastic radial expansion, the selected gap occurs across an entire length of the pin and box threads.

11. A method of designing a tubular having a connection with a pin member and a box member, the method comprising:
- determining an amount of radial expansion and a method for radially expanding the tubular; and
- selecting a gap size between a box thread crest and a pin thread root based on the amount of radial expansion and the method for radially expanding the tubular, wherein the gap exists upon selected make-up of the box member with the pin member,
- wherein a root/crest thread seal is formed between the box member and pin member after a radial expansion thereof.

12. A method of expanding a connection with a pin member and a box member, the method comprising:
- making-up the pin member with the box member such that a selected gap exists between a box thread crest and a pin thread root; and
- expanding the connection such that there is a desired interference between the box thread crest and the pin thread root forming a thread seal over a portion of the connection.

13. A method of expanding a connection with a pin member and a box member, the method comprising:
- making-up the pin member with the box member such that a selected gap exists between a box thread root and a pin thread crest; and
- expanding the connection such that there is a desired interference between the box thread root and the pin thread crest forming a thread seal over a portion of the connection.

* * * * *